US005393341A

United States Patent [19]

Meier et al.

[11] Patent Number: 5,393,341

[45] Date of Patent: Feb. 28, 1995

[54] METHOD AND APPARATUS FOR THE PRODUCTION OF STRUCTURAL FOAM, PARTICULARLY CEMENT FOAM

[75] Inventors: Dieter Meier, Erlangen; Heinz Ruppert, Wolframs-Eschenbach, both of Germany

[73] Assignee: RUME Maschinenbau GmbH, Nuermberg, Germany

[21] Appl. No.: 173,262

[22] Filed: Dec. 23, 1993

Related U.S. Application Data

[63] Continuation of Ser. No. 892,843, Jun. 3, 1992, abandoned.

[30] Foreign Application Priority Data

Jun. 6, 1992 [DE] Germany ............................ 4118537

[51] Int. Cl.[6] .............................................. C04B 24/00

[52] U.S. Cl. .................................... 106/605; 106/672; 106/682; 106/820; 264/42; 264/50

[58] Field of Search ............... 106/682, 638, 605, 672, 106/820; 264/41, 42, 50, 51, 53, 43, 82

[56] References Cited

U.S. PATENT DOCUMENTS 5,098,267 3/1993 Cheng .................................. 264/50

FOREIGN PATENT DOCUMENTS

| | | | |
|---|---|---|---|
| 2503617 | 10/1982 | France | 106/682 |
| 3132667 | 2/1983 | Germany | 106/682 |
| 0086472 | 5/1986 | Japan | 106/682 |
| 1239916 | 10/1986 | Japan | 264/50 |
| 2086748 | 5/1982 | United Kingdom | 106/682 |

*Primary Examiner*—Mark L. Bell

*Assistant Examiner*—Paul Marcantoni

*Attorney, Agent, or Firm*—Jordan and Hamburg

[57] ABSTRACT

A method for the production of structural foam from air, water, foaming agent and an aggregate, particularly cement foam, for which cement slurry is blown under high pressure into a mixing chamber and mixed with a foaming agent and the mixture immediately thereafter is conveyed to an expansion nozzle, into which metered amounts of compressed air are blown.

19 Claims, 1 Drawing Sheet

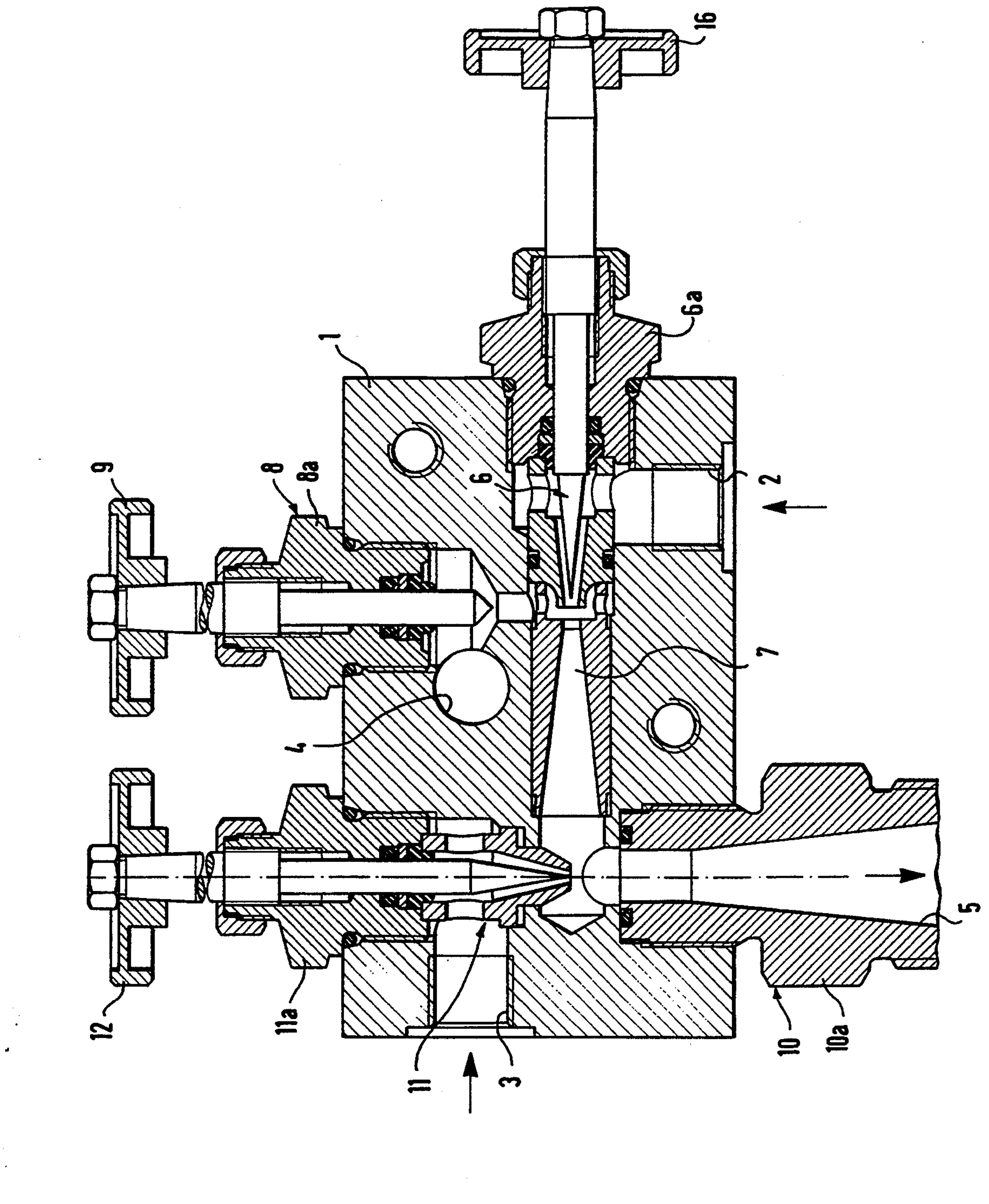
16
1
6a
9
8
8a
6
2
7
4
12
11a
11
3
10
10a
5

METHOD AND APPARATUS FOR THE PRODUCTION OF STRUCTURAL FOAM, PARTICULARLY CEMENT FOAM

This application is a continuation, of application Ser. No. 07/892,843, filed Jun. 3, 1992, now abandoned.

FIELD OF THE INVENTION

The invention relates to a method for producing structural foam from air, water, foaming agents and an aggregate, particularly cement foam.

BACKGROUND OF THE INVENTION

For the sake of simplicity, the invention is described using the most frequently used cement foam as an example of the production of such structural foams. The invention is, however, not to be limited to such cement foams. At the present time, the following procedure is usually employed for such structural foams.

To begin with, a foam is produced from air, water and a foaming agent, generally with the help of perforated disks arranged in series. This foam is supplied to a mixing apparatus at the mixing site. Over an additional pipeline, the pre-mixed cement slurry is brought into the mixing apparatus. When processing a cement foam in the upper floor of a house, the apparatus for producing the cement slurry and the foaming agent are usually on the first floor. This makes it necessary to force the heavy cement slurry to the top with the help of screw conveyors or the like. A further difficulty of the method used until now lies therein that, by mixing the pre-mixed foam with the cement, only so-called heavy foam with foam weights of 800 kg/cm$^3$ or more can be produced.

SUMMARY OF THE INVENTION

It is therefore an object of the invention to provide a method as well as an apparatus, which is suitable for carrying out the method, which make it possible to produce and process even a light foam in a simple manner.

Pursuant to the invention, this objective is accomplished by injecting cement slurry under high pressure into a mixing chamber and mixing it with a foaming agent and passing the mixture immediately thereafter into an expansion nozzle, into which measured amounts of compressed air are blown.

For the inventive method, the production of the cement foam takes place quasi in one step. As a result of its low specific gravity, the cement foam can then be conveyed in a hose connected to the expansion nozzle to higher floors by the high pressures of the injected additives alone, without requiting an expensive spiral conveyor or the like for this purpose. The inventive quasi one-step production of the cement foam instead of the mixture of cement slurry with a previously produced foam moreover makes it possible to attain very much lower foam densities of about 250 to 400 kg/cm$^3$.

Extensive investigations, on which the present invention is based, have shown that outstanding results can be achieved with low foam weights and with simple, direct conveying of the foam even to higher floors, if the cement slurries are injected under a pressure of about 25 bar into the mixing chamber, while the pressure of the compressed air that is additionally passed into the expansion preferably ought to be about 8 bar.

For carrying out the inventive method, the invention provides a valve block with connections for the cement slurry, the foaming agent and the compressed air as well as an outgoing foam pipeline, the outlet axis of the injection-mixing nozzle for the mixture of cement slurry and foaming agent being transverse, essentially perpendicular to the expansion nozzle that is aligned with the outlet axis of the compressed air injection nozzle.

Due to the inventive arrangement, a very small valve block can be constructed, on which the adjusting wheels for the injection nozzles for the cement slurry, the foaming agent and the compressed air are preferably constructed as metering valves, which can be operated from the outside, are readily manipulated from the outside and partly protrude in different directions. It is particularly advantageous if the injection nozzles are interchangeably disposed in a block having connecting boreholes to the external connection, as well as between different injection nozzles.

Further advantages, characteristics and details of the invention arise out of the following description of an embodiment as well as from the drawing.

IN THE DRAWING

The single figure is a sectional view of a valve block according to the invention.

DESCRIPTION OF THE PREFERRED EMBODIMENTS

In a basic block 1, a connection 2 for a hose for injecting cement slurry as well as a connection 3 for a compressed air hose and, finally, a further connection 4 for the foaming agent are provided, while a connection for the outgoing cement foam pipeline is indicated at 5.

The cement slurry, drawn in by means of a pressure pump and brought in at a pressure of about 28 bar over the connection 2, is injected into a mixing chamber 7 with the help of an injection valve 6 with an adjusting wheel 6. The foaming agent is also injected into the mixing chamber 7 over a second injection valve 8 with adjusting wheel 9. At the end of the mixing chamber 7, a transverse, outgoing expansion nozzle 10 is disposed, the axis of which is aligned with the outlet axis of a compressed air valve 11 with adjusting wheel 12, in order to mix the compressed air, introduced over connection 3, immediately after emerging into the mixing chamber 7 intimately with the mixture of cement slurry and foaming agent. As a result of the high pressure, this mixture foams up directly in the expansion nozzle 10 into a cement foam of low foam weight, so that no further pump or the like is required in order to transport this finished cement foam further to the processing site. The high pressure of about 25 bar in the foam pipeline, which can be constructed, for example, as a ¾" pipeline and connected to the outgoing pipeline 5, makes it possible for this foam to be automatically conveyed further, even to higher floors, since the weight of the foam in a pipeline that is 10 or 15 m long is still so slight, that the high pressure in the expansion chamber continues to be sufficient for the automatic conveying.

The different values and nozzles 6, 8, 11 and 10 can be screwed preferably as interchangeable parts 6*a*, 8*a*, 11*a* and 10*a* into corresponding boreholes of the basic body 1, so that, in use, a very simple, problem-free exchange is possible in the event of damage or wear.

The invention is not limited to the embodiment shown. Aside from the possibility, which was already addressed at the beginning, of producing also other structural foams, in which a different bonding agent is used instead of cement, it would, of course, also be possible to realize the disposal of the nozzles in a different way. What is essential, however, is the quasi one-step foaming that avoids the previous two-step method, for which a finished foam is mixed only subsequently with the bonding agent.

We claim:

1. A method for producing structural foam from air, water, a foaming agent and an aggregate, comprising the steps of:
- injecting cement slurry under high pressure into a mixing chamber having a substantially unobstructed mixing passageway;
- injecting said foaming agent into the mixing passageway;
- mixing said injected cement slurry in said mixing passageway with a foaming agent to form a mixture;
- effecting said mixing substantially solely by said steps of injecting said cement slurry and said foaming agent into said unobstructed mixing passageway;
- immediately thereafter supplying said mixture to an expansion nozzle; and
- blowing measured amounts of compressed air into said expansion nozzle to foam up said mixture in the expansion nozzle into a cement foam of low foam weight.

2. The method according to claim 1, wherein said step of injecting said cement slurry includes the step of injecting said cement slurry under a pressure of approximately 25 bar.

3. The method according to claim 2, wherein said step of blowing includes the step of blowing measured amounts of the compressed air into said expansion nozzle under a pressure of approximately 8 bar.

4. The method according to claim 1, wherein said step of blowing includes the step of blowing measured amounts of the compressed air into said expansion nozzle under a pressure of approximately 8 bar.

5. The method according to claim 1, wherein the mixing chamber has a substantially frusto-conical configuration.

6. A method according to claim 1 further comprising passing said mixture through a substantially right angle turn when passing from said mixture passageway to said expansion nozzle.

7. A method according to claim 1 further comprising effecting said mixing of said cement slurry and said foaming agent in said mixing passageway by utilizing and elongated, unobstructed mixing passageway having an inlet end and an outlet end and injecting said cement slurry and foaming agent into said inlet end.

8. A method according to claim 7 further comprising utilizing an expansion nozzle having an elongated, substantially unobstructed nozzle passage having an inlet end and an outlet end and injecting said compressed air into said inlet end.

9. A method according to claim 8 further comprising disposing said mixing passageway relative to said nozzle passage such that an elongate axis of said elongated mixing passageway is substantially perpendicular to an elongate axis of said elongated nozzle passage.

10. A method according to claim 9 further comprising injecting said cement slurry into said mixing passageway in a direction aligned with said elongate axis of said mixing passageway.

11. A method according to claim 10 further comprising injecting said compressed air into said nozzle passage in a direction aligned with said elongate axis of said nozzle passage.

12. A method of producing a structural foam from air, water, a foaming agent and an aggregate comprising the steps of:
- providing a block having an inlet connection for cement slurry, an inlet connection for compressed air, an inlet connection for a foaming agent and an outlet connection for cement foam;
- introducing a cement slurry into said inlet connection for cement slurry;
- injecting said introduced cement slurry into a mixing chamber in said block;
- controlling said injection of the cement slurry utilizing a cement slurry injection value disposed on said block;
- introducing a foaming agent into said inlet connection for a foaming agent;
- injecting said foaming agent into said mixing chamber;
- controlling said injection of foaming agent utilizing a foaming agent control valve disposed on said block;
- utilizing an elongated mixing chamber having an inlet end and an outlet end with a substantially unobstructed passageway between said inlet end and outlet end;
- said step of injecting said cement slurry and said step of injecting said foaming agent comprising injecting said cement slurry into said inlet end of said mixing chamber and injecting said foaming agent into said inlet end of said mixing chamber;
- effecting mixing of said cement slurry and said foaming agent in said mixing chamber as said injected cement slurry and injected foaming agent traverse said substantially unobstructed passage of said mixing chamber from said inlet end to said outlet end;
- introducing compressed air into said inlet connection for pressed air;
- injecting said compressed air into an expansion nozzle on said block;
- controlling said injection of compressed air utilizing a compressed air control valve disposed on said block;
- utilizing an elongated expansion nozzle having an inlet end and an outlet end with a substantially unobstructed nozzle passageway between said inlet end and said outlet end;
- conducting the mixed cement slurry and foaming agent immediately form said outlet end of said mixing chamber to said juxta-posed inlet of said nozzle passage of said expansion nozzle;
- said step of introducing compressed air into said nozzle passage of said expansion nozzle effecting foaming of the mixed cement slurry and foaming agent into a cement foam within said expansion nozzle; and
- conducting said cement foam from the outlet of the nozzle passage of said expansion nozzle directing to a processing cite.

13. A method according to claim 12 further comprising passing said mixture of cement slurry and foaming agent through a substantially right angle turn when passing from said mixing chamber passageway to said expansion nozzle passage.

14. A method according to claim 12 further comprising positioning said mixing chamber relative to said expansion nozzle such that a longitudinal axis of said passageway of said mixing chamber is substantially perpendicular to a longitudinal axis of said nozzle passage of said expansion nozzle.

15. A method according to claim 14 wherein said steps of effecting mixing of said cement slurry and said foaming agent in said substantially unobstructed passageway as said cement slurry and foaming agent traverse said mixing chamber from said inlet end to said outlet end comprises progressively increasing the size of the cross sectional area of said passageway from said inlet end to said outlet end.

16. A method according to claim 12 further comprising progressively increasing the size of the cross sectional area of said nozzle passageway of said expansion nozzle from said inlet end to said outlet end.

17. A method according to claim 12 wherein said step of controlling the injection of cement slurry utilizing a cement slurry injection valve comprises positioning a moveable injection valve closure member to move along a longitudinal axis substantially aligned with the longitudinal axis of said passageway of said mixing chamber.

18. A method according to claim 12 wherein said step of controlling the injection os compressed air utilizing a compressed air injection valve comprises positioning a moveable injection valve closure member to move along a longitudinal axis which is substantially aligned with the longitudinal axis of said passage of said expansion nozzle.

19. A method according to claim 12 further comprising positioning said longitudinal axis of said passageway of said mixing chamber to be disposed substantially perpendicular to the longitudinal axis of said passage of said expansion nozzle.

* * * * *

UNITED STATES PATENT AND TRADEMARK OFFICE

CERTIFICATE OF CORRECTION

PATENT NO. : 5,393,341

DATED : February 28, 1995

INVENTOR(S) : Dieter Meier, et. al.

It is certified that error appears in the above-indentified patent and that said Letters Patent is hereby corrected as shown below:

Title page, item [30] under the heading "Foreign Application Priority Data", change "1992" to --1991-- so that the entry will indicate that the German Priority Application was filed on June 6, 1991.

Title page, item [73] Assignee: change Assignee's adress from "Nuermberg" to --Nuernberg--.

Signed and Sealed this

Thirtieth Day of May, 1995

Attest:

Bruce Lehman

BRUCE LEHMAN

*Attesting Officer*

*Commissioner of Patents and Trademarks*